United States Patent
Ling et al.

(10) Patent No.: US 7,720,027 B2
(45) Date of Patent: May 18, 2010

(54) SYSTEM AND METHOD FOR A FORWARD LINK ONLY PHYSICAL LAYER

(75) Inventors: Fuyun Ling, San Diego, CA (US); Murali Ramaswamy Chari, San Diego, CA (US); Rajiv Vijayan, San Diego, CA (US); Ashok Mantravadi, San Diego, CA (US); Alok Kumar Gupta, Encinitas, CA (US); Krishna Kiran Mukkavilli, San Diego, CA (US); Michael Mao Wang, San Diego, CA (US); Bojan Vrcelj, San Diego, CA (US); Bruce Collins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 616 days.

(21) Appl. No.: 11/495,480

(22) Filed: Jul. 27, 2006

(65) Prior Publication Data

US 2007/0070971 A1    Mar. 29, 2007

Related U.S. Application Data

(60) Provisional application No. 60/703,315, filed on Jul. 27, 2005.

(51) Int. Cl.
*H04W 4/00* (2009.01)
(52) U.S. Cl. ............... 370/328; 709/236; 455/9; 455/550.1; 455/445; 455/424; 375/260; 370/312
(58) Field of Classification Search ........... 370/328; 375/260
See application file for complete search history.

(56) References Cited

U.S. PATENT DOCUMENTS

| | | |
|---|---|---|
| 6,606,311 B1 | 8/2003 | Wang et al. |
| 2006/0256708 A1* | 11/2006 | Wang et al. ............ 370/206 |
| 2006/0288117 A1* | 12/2006 | Raveendran et al. ....... 709/236 |
| 2008/0107192 A1 | 5/2008 | Mukkavilli et al. |
| 2008/0176546 A1 | 7/2008 | Devico et al. |
| 2009/0019461 A1 | 1/2009 | Gautam et al. |

OTHER PUBLICATIONS

TIA: "Forward Link Only Air Interface Specification Rev. 1.1" Internet Citation, 2005.
Zhang, Q et al.—Institute of Electrical and Electronics Engineers: "UMTS Air Interface Voice/Data Capacity—Part 2: Forwark Link Analysis" VTC 2001 Sping. IEEE VTS 53rd. Vehicular Technology Conference. Rhodes, Greece, May 6-9, 2001, IEEE Vehicular Technology Conference, New York, NY: IEEE, US. vol. 4 of 4. conf. 53, May 6, 2001, pp. 2730-2734.

(Continued)

*Primary Examiner*—Rafael Pérez-Gutiérrez
*Assistant Examiner*—Munjalkumar Patel
(74) *Attorney, Agent, or Firm*—Gerald P. Joyce, III

(57) ABSTRACT

Systems and methods are provided for processing forward link only (FLO) signals. A device receives a FLO signal, processes a TDM pilot comprising a TDM Pilot 1, a TDM Pilot 2, a WIC, a LIC, a Transition Pilot Channel, and a Positioning Pilot, from the FLO signal, processes an overhead information symbol (OIS) comprising a wide-area OIS and a local-area OIS, from the FLO signal, processes an FDM pilot comprising a wide-area FDM pilot and a local-area FDM pilot, from the FLO signal; and processes data comprising wide-area data and local-area data, from the FLO signal.

40 Claims, 9 Drawing Sheets

OTHER PUBLICATIONS

TIA: "Forward Link Only Air Interface Specification Rev. 1.1" Internet Citation, [Online] 2005, ZP002387062, Retrieved from the Internet: URL:http://ftp.tiaonline.org/TR-47/TR471/Working/20060100-Arlington-meeting1/TR471-20060100-004a_FLO%20AIR.pdf>[retrieved on Jun. 26, 2006], paragraph [01.4], paragraph [01.5], and figures 1.5-2.

Zhang, Qinqing, "UMTS Air Interface Voice/Data Capacity—Part 2: Forward Link Analysis", VTC 2001, Spring. IEEE, VTS 53rd. Vehicular Technology Conference, Rhodes, Greece, May 6-9, 2001. pp. 2730-2734.

International Search Report - PCT/US06/029621, International Searching Authority - European Patent Office, Jan. 19, 2007.

Written Opinion - PCT/US06/029621, International Searching Authority - European Patent Office, Jan. 19, 2007.

International Preliminary Report on Patentability - PCT/US06/029621, IPEA - European Patent Office, Jul. 16, 2007.

* cited by examiner

SYSTEM AND METHOD FOR A FORWARD LINK ONLY PHYSICAL LAYER

CLAIM OF PRIORITY UNDER 35 U.S.C. §119

The present Application for Patent claims priority to Provisional Application No. 60/703,315, entitled "FLO Air Interface" filed Jul. 27, 2005, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:
"System and Method for a Forward Link Only Protocol Suite," application Ser. No. 11/495,324, filed concurrently herewith, assigned to the assignee hereof, and expressly incorporated by reference herein; and "System and Method for Forward Link Only Messages," application Ser. No. 11/495,267, , filed concurrently herewith, assigned to the assignee hereof, and expressly incorporated by reference herein.

BACKGROUND

I. Field

The subject technology relates generally to communications systems and methods, and more particularly to systems and methods for a forward link only wireless system.

II. Background

Forward Link Only (FLO) is a digital wireless technology that has been developed by an industry-led group of wireless providers. FLO technology uses advances in coding and interleaving to achieve high-quality reception, both for real-time content streaming and other data services. FLO technology can provide robust mobile performance and high capacity without compromising power consumption. The technology also reduces the network cost of delivering multimedia content by dramatically decreasing the number of transmitters needed to be deployed. In addition, FLO technology-based multimedia multicasting complements wireless operators' cellular network data and voice services, delivering content to the same cellular handsets used on 3G networks.

The FLO wireless system has been designed to broadcast real time audio and video signals, apart from non-real time services to mobile users. The respective FLO transmission is carried out using tall and high power transmitters to ensure wide coverage in a given geographical area. Further, it is common to deploy 3-4 transmitters in most markets to ensure that the FLO signal reaches a significant portion of the population in a given market. During the acquisition process of a FLO data packet several determinations and computations are made to determine such aspects as frequency offsets for the respective wireless receiver. Given the nature of FLO broadcasts that support multimedia data acquisitions, efficient processing of such data and associated overhead information is paramount. For instance, when determining frequency offsets or other parameters, complex processing and determinations are required where determinations of phase and associated angles are employed to facilitate the FLO transmission and reception of data.

Wireless communication systems such as FLO are designed to work in a mobile environment where the channel characteristics in terms of the number of channel taps with significant energy, path gains and the path delays are expected to vary quite significantly over a period of time. In an OFDM system, the timing synchronization block in the receiver responds to changes in the channel profile by selecting the OFDM symbol boundary appropriately to maximize the energy captured in the FFT window. When such timing corrections take place, it is important that the channel estimation algorithm takes the timing corrections into account while computing the channel estimate to be used for demodulating a given OFDM symbol. In some implementations, the channel estimate is also used to determine timing adjustment to the symbol boundary that needs to be applied to future symbols, thus resulting in a subtle interplay between timing corrections that have already been introduced and the timing corrections that will be determined for the future symbols. Further, it is common for channel estimation block to process pilot observations from multiple OFDM symbols in order to result in a channel estimate that has better noise averaging and also resolves longer channel delay spreads. When pilot observations from multiple OFDM symbols are processed together to generate channel estimate, it is important that the underlying OFDM symbols are aligned with respect to the symbol timing.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Systems and methods are provided for processing forward link only wireless signals involving processing a TDM pilot, an overhead information symbol, an FDM pilot, and data. Processing an overhead information symbol (OIS) comprises a wide-area OIS and a local-area OIS, from the FLO signal, wherein the wide-area OIS conveys information required to locate relevant data symbols in a wide-area data channel;

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

As used in this application, the terms "component," "network," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

Figure 1:
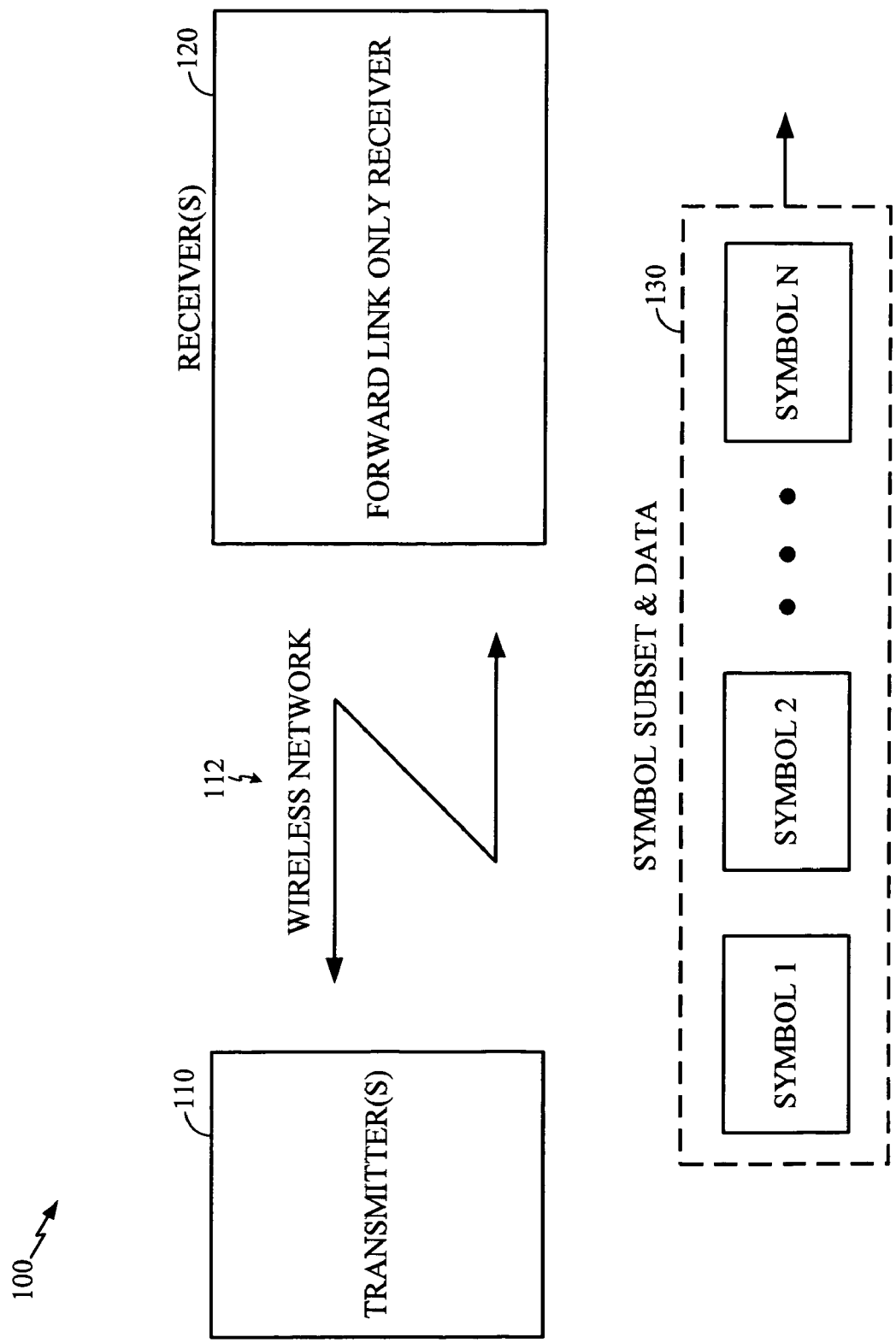
FIG. 1 illustrates a wireless network system for forward link only networks in accordance with an embodiment.

The FLO technology was designed in an embodiment for a mobile multimedia environment and exhibits performance characteristics suited for use on cellular handsets. FIG. 1 illustrates a wireless network system 100 for forward link only networks in accordance with an embodiment. The system 100 includes one or more transmitters 110 that communicate across a wireless network 112 to one or more receivers 120. The receivers 120 can include substantially any type of communicating device such as a cell phone, computer, personal assistant, hand held or laptop devices, and so forth. Portions of the receiver 120 are employed to decode a symbol subset 130 and other data such as multimedia data. The symbol subset 130 is generally transmitted in an Orthogonal Frequency Division Multiplexing (OFDM) network that employs forward link only (FLO) protocols for multimedia data transfer. Channel estimation is generally based on uniformly spaced pilot tones inserted in the frequency domain, and in respective OFDM symbols. The pilots are spaced 8 carriers apart, and the number of pilot carriers is set at 212.

In an embodiment, a FLO system multicasts several services. A service is an aggregation of one or more independent data components. Each independent data component of a service is called a flow. For example, a flow can be the video component, audio component, text or signaling component of a service.

In an embodiment, services are classified into two types based on their coverage: Wide-area services and Local-area services. A Local-area service is multicast for reception within a metropolitan area. By contrast, Wide-area services are multicast in one or more metropolitan areas.

FLO services are carried over one or more logical channels. These logical channels are called Multicast Logical Channels or MLCs. In an embodiment, an MLC may be divided into a maximum of three logical sub-channels. These logical sub-channels are called streams. Each flow is carried in a single stream.

In general, FLO technology utilizes Orthogonal Frequency Division Multiplexing (OFDM), which is also utilized by Digital Audio Broadcasting (DAB), Terrestrial Digital Video Broadcasting (DVB-T), and Terrestrial Integrated Services Digital Broadcasting (ISDB-T). Generally, OFDM technology can achieve high spectral efficiency while effectively meeting mobility requirements in a large cell SFN. Also, OFDM can handle long delays from multiple transmitters with a suitable length of cyclic prefix; a guard interval added to the front of the symbol (which is a copy of the last portion of the data symbol) to facilitate orthogonality and mitigate inter-carrier interference. As long as the length of this interval is greater than the maximum channel delay, reflections of previous symbols are removed and the orthogonality is preserved.

Figure 2:
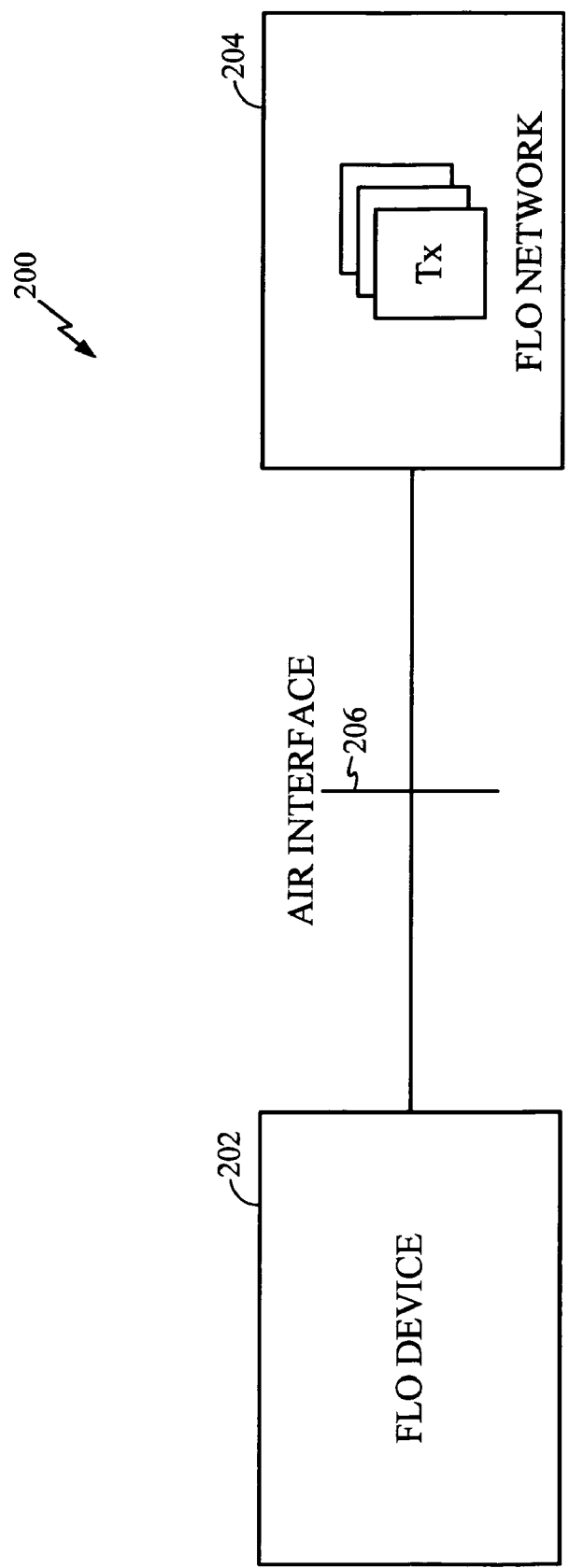
FIG. 2 is a diagram illustrating an architecture reference model in accordance with an embodiment.

FIG. 2 is a diagram illustrating an architecture reference model in accordance with an embodiment. The reference model consists of the following functional units: The FLO device 202 and the FLO network 204. The reference model includes the air interface 206 between the FLO device and the FLO network. From the perspective of this reference model the FLO Network consists of multiple transmitters. In the FLO system, transmitters within a metropolitan area transmit identical waveforms. The term Local-area is used to denote such a group of transmitters. Transmitters in one or more metropolitan areas that multicast the same Wide-area services constitute a Wide-area. Hence, a Wide-area consists of one or more Local-areas, with the transmitters in the different Local-areas multicasting different Local-area services. As a result, the transmit waveform is not identical for all Wide-area transmitters. Finally, transmitters in different Wide-areas also transmit different waveforms, since they multicast different Wide-area and Local-area services.

Figure 3:
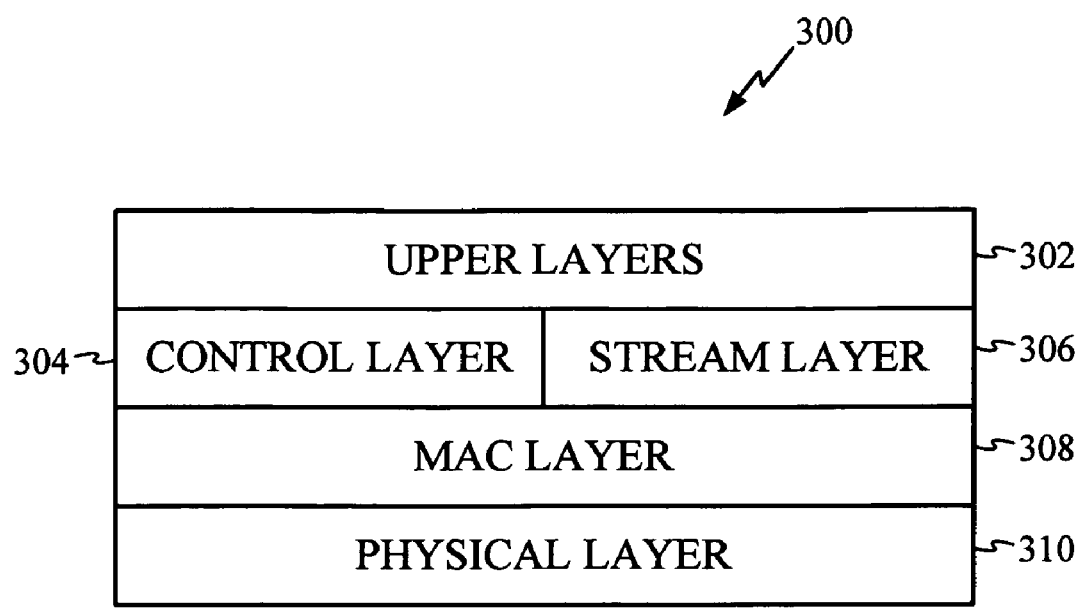
FIG. 3 is a diagram illustrating a layering architecture for the system in accordance with an embodiment.

The air interface is layered, with the interface defined for each layer. FIG. 3 is a diagram illustrating a layering architecture 300 for the FLO System in accordance with an embodiment. The layers are:

Upper Layers 302: The "upper" protocol layers provide multiple functions including compression of multimedia content, controlling access to the multimedia content and formatting of Control information.

Control Layer 304: This layer is used by the network to disseminate information to facilitate the device operation in the FLO system. The device uses the Control layer to maintain synchronization of its Control information with that in the network.

Stream Layer 306: The Stream layer provides for binding of upper layer flows to streams on an MLC-by-MLC basis. The Stream layer is at the same level as the Control layer in the air interface layering architecture.

MAC Layer 308: This layer does multiplexing of packets belonging to different media streams associated with MLCs. The MAC (Medium Access Control) layer defines the procedures used to receive and transmit over the Physical layer.

Physical Layer 310: The Physical layer provides the channel structure, frequency, power output, modulation and encoding specification for the Forward Link.

Figure 4:
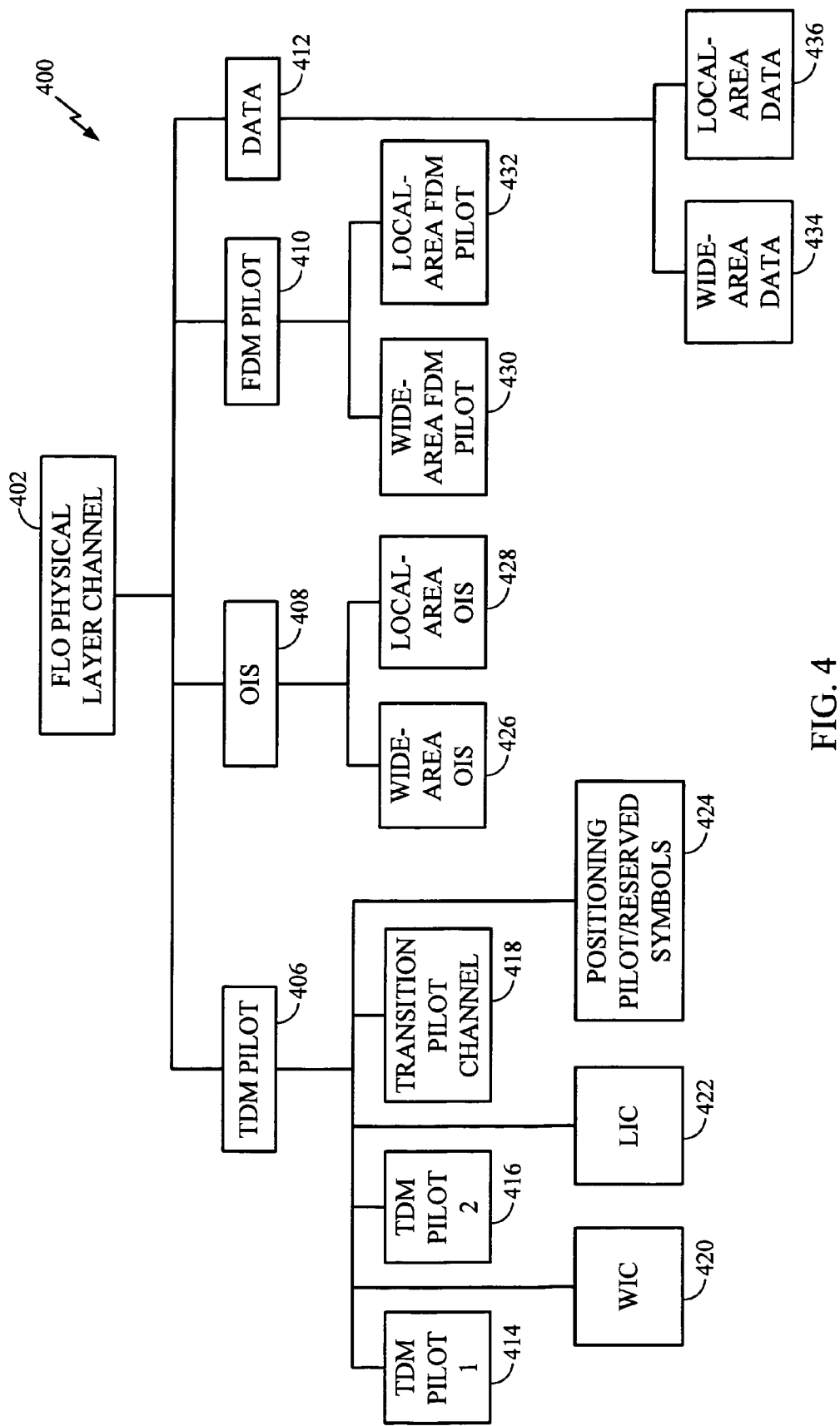
FIG. 4 is a diagram illustrating the Physical layer in accordance with an embodiment.

The Physical layer defines the FLO Physical layer channels and hierarchies shown in FIG. 4 in accordance with an embodiment. The FLO Physical Layer 400 Channel 402 comprises a TDM Pilot 406, OIS 408, FDM Pilot 410, and Data 412. The TDM Pilot Channel comprises the component channels TDM Pilot 1 414, TDM Pilot 2 416, Transition Pilot Channel 418, WIC 420, LIC 422, and Positioning Pilot/Reserved Symbols 424. The OIS 408 comprises a Wide-area OIS 426 and a Local-area OIS 428. The FDM Pilot 410 comprises a Wide-area FDM Pilot 430 and a Local-areaFDM Pilot 432. Data 412 comprises Wide-areaData 434 and Local-areaData 436.

The transmitted signal in the FLO system is organized into superframes. In an embodiment, each superframe has duration of 1s. In an embodiment each superframe comprises 1200 OFDM symbols.

The term Wide-area refers to a group of transmitters radiating identical waveform and with a footprint covering one or more metropolitan areas. The term Local-area refers to group of transmitters radiating identical waveforms with a footprint that is less than that for a Wide-area.

Figure 5:
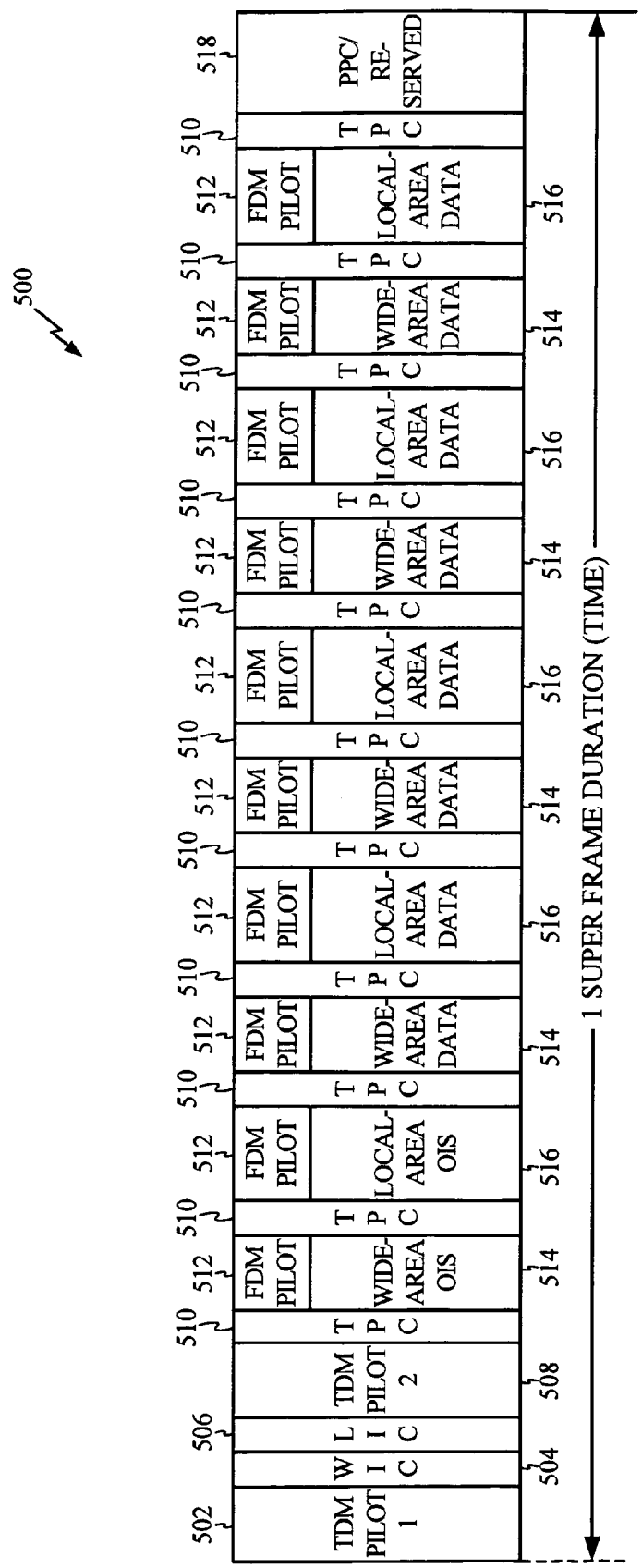
FIG. 5 is a diagram illustrating the Physical Layer Superframe Structure in accordance with an embodiment.

FIG. 5 is a diagram illustrating the FLO Physical Layer Superframe Structure 500 in accordance with an embodiment. It shows the general relationship (not to scale) between the various Physical layer channels.

In an embodiment, a superframe is equal to 1200 OFDM symbols with a one second time duration. The FLO physical layer uses a 4K mode (yielding a transform size of 4096 sub-carriers), providing superior mobile performance compared to an 8K mode, while retaining a sufficiently long guard interval that is useful in fairly large SFN cells. Rapid channel acquisition can be achieved through an optimized pilot and interleaver structure design. The interleaving schemes incorporated in the FLO air interface facilitate time diversity. The pilot structure and interleaver designs optimize channel utilization without annoying the user with long acquisition times.

In an embodiment, each superframe consists of 200 OFDM symbols per MHz of allocated bandwidth (1200 symbols for 6 MHz), and each symbol contains seven interlaces of active sub-carriers. Each interlace is uniformly distributed in frequency, so that it achieves the full frequency diversity within the available bandwidth. These interlaces are assigned to logical channels that vary in terms of duration and number of actual interlaces used. This provides flexibility in the time diversity achieved by any given data source. Lower data rate channels can be assigned fewer interlaces to improve time diversity, while higher data rate channels utilize more interlaces to minimize the radio's on-time and reduce power consumption.

The acquisition time for both low and high data rate channels is generally the same. Thus, frequency and time diversity can be maintained without compromising acquisition time. Most often, FLO logical channels are used to carry real-time (live streaming) content at variable rates to obtain statistical multiplexing gains possible with variable rate codecs (Compressor and Decompressor in one). Each logical channel can have different coding rates and modulation to support various reliability and quality of service requirements for different applications. The FLO multiplexing scheme enables device receivers to demodulate the content of the single logical channel it is interested in to minimize power consumption. Mobile devices can demodulate multiple logical channels concurrently to enable video and associated audio to be sent on different channels.

Error correction and coding techniques can also be employed. Generally, FLO incorporates a turbo inner code and a Reed Solomon (RS) outer code. Typically, the turbo code packet contains a Cyclic Redundancy Check (CRC). The RS code need not be calculated for data that is correctly received, which, under favorable signal conditions, results in additional power savings. Another aspect is that the FLO air interface is designed to support frequency bandwidths of 5, 6, 7, and 8 MHz. A highly desirable service offering can be achieved with a single Radio Frequency channel.

Four of the six TDM Pilot channels namely TDM Pilot 1 502, Wide-area Identification Channel (WIC) 504, Local-area Identification Channel (LIC) 506 and TDM Pilot 2 508 occur consecutively during the first four OFDM symbols in the figure. The FDM Pilot channel is frequency division multiplexed with the Overhead Information Symbols (OIS) Channels and Data Channels. The Transition Pilot Channel (TPC) 510 is time division multiplexed with the OIS and the Data Channels over a superframe. The Positioning Pilot Channel (PPC) 518 or 2, 6, 10, or 14 Reserved OFDM symbols appear at the end of the superframe. In order to support the transmission of Wide-area and Local-area services:

The OIS Channel is divided into the Wide-area OIS Channel and the Local-area OIS Channel, which are time-division multiplexed within the OIS Channel.

The FDM Pilot Channel 512 is divided into the Wide-area FDM Pilot Channel 514 and the Local-area FDM Pilot Channel 516, which are time-division multiplexed within the FDM Pilot Channel.

The Data Channel is divided into the Wide-area Data Channel and the Local-area Data Channel, which are time-division multiplexed within the Data Channel.

Wide-area services that are multicast in a specific Wide-area are transmitted in the Wide-area Data Channel, while the Local-area services that are multicast in a specific Local-area are transmitted in the Local-area Data Channel.

The generic term "entity" is used to refer to either a FLO device or a FLO network. An embodiment includes the following types of interfaces:

Headers and Messages are used for communication between a protocol executing in one entity and the same protocol executing in another entity.

Commands are used by a protocol to obtain a service from another protocol within the same FLO network or device.

Indications are used by a lower layer protocol to convey information regarding the occurrence of an event. Any higher layer protocol can register to receive these indications. A same layer protocol can also register to receive an indication but only in one direction.

Public Data is used to share information in a controlled way between protocols. Public data is shared between protocols in the same layer, as well as between protocols in different layers.

Indications are always written in the past tense since they announce events that have happened. Headers and messages are binding on all implementations. Indications and public data are used as a device for a clear and precise specification. FLO devices and FLO networks can be compliant while choosing a different implementation that exhibits identical behavior.

Figure 6:
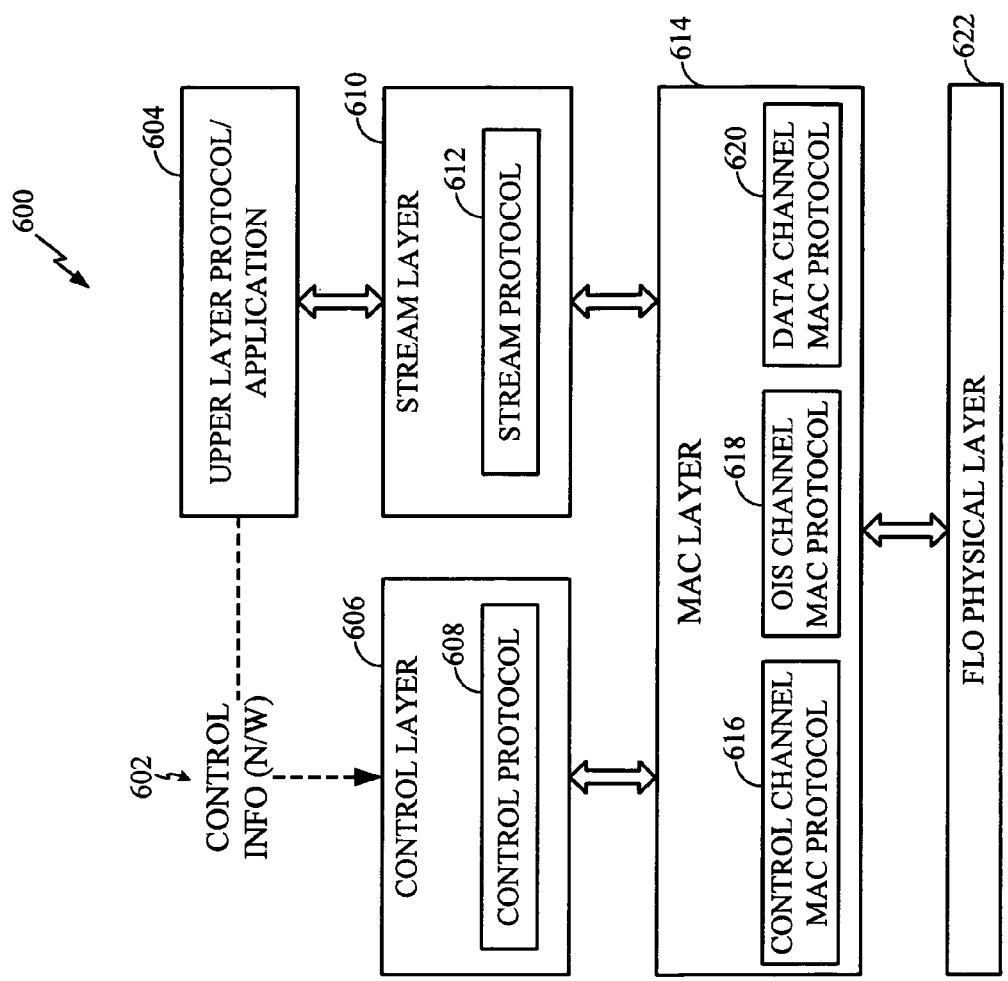
FIG. 6 is a diagram illustrating a protocol suite showing each of the layers in accordance with an embodiment.

FIG. 6 illustrates a protocol suite 600 showing each of the layers in accordance with an embodiment. Control information 602 is shown to be transferred from the Upper Layer Protocol/Application Protocol 604 to a Control Layer 606. The Control Layer includes a Control Protocol 608. The Upper Layer Protocol/Application Protocol 604 interfaces with the Stream Layer 610. The Stream Layer includes a Stream Protocol 612. The Control Layer 606 interfaces with the MAC Layer 614 and the Stream Layer 610 interfaces with the MAC Layer 614.

The MAC Layer 614 includes a Control Channel 616, an OIS Channel 618, and a Data Channel 620. The Control Channel 616, OIS Channel 618, and Data Channel 620 use a MAC Protocol. The MAC Layer 614 interfaces with the FLO Physical Layer 622.

Figure 7:
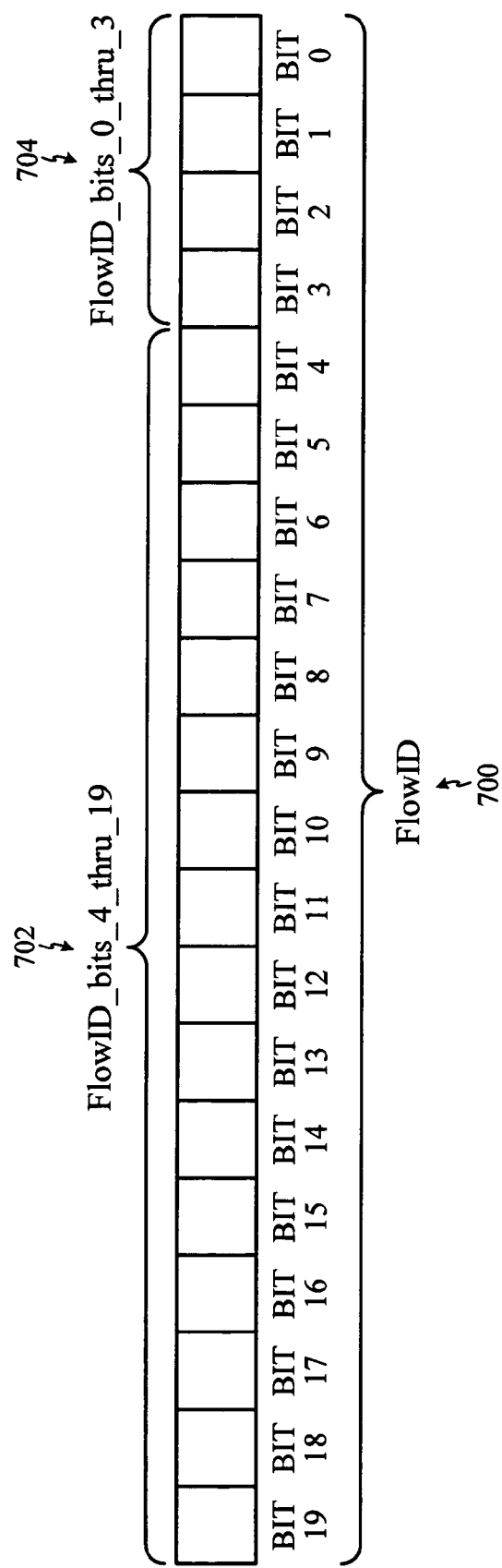
FIG. 7 is a diagram illustrating the structure of a FlowID in accordance with an embodiment.

The service offered by the FLO network consists of multicasting data flows (referred to simply as flows) provided by the upper layers. The role of the Control layer is to provide the device with the information needed to receive particular flow(s). In an embodiment, each flow is addressed by a unique, 20-bit identifier called a FlowID 700. The FlowID comprises two parts: FlowID_bits_4_thru_19 702 and FlowID_bits_0_thru_3 704. The structure of the FlowID in accordance with an embodiment is shown in FIG. 7.

The flows are carried over logical channels. These logical channels are called Multicast Logical Channels or MLCs.

The Control layer of the network disseminates information (referred to as control information) needed by the device to operate in the FLO system. The Control layer of the device receives this information and maintains synchronization of its control information with that in the network. The Control layer provides the latest information to other protocol entities. The Control layer maintains three categories of information:

Flow Description Information: This includes the mapping of flows to MLCs and flow configuration parameters.
  Radio Frequency Channel Information: This includes the Radio Frequency Channels in use in the FLO network.
  Neighbor List Information: This includes the list of neighboring Wide-areas and Local-areas.

The Control layer maintains and disseminates the information in each of the above categories as two logically separate classes, namely, Bin 0 and Bin 1. This separation allows the network to localize updates to the control information to a particular bin. This allows the FLO devices to process and utilize the information in one bin independent of the other. The Control layer functions are implemented by the Control protocol.

The Control protocol shall set the Control protocol packet header as shown in Table 1.

TABLE 1

| Field | Length (bits) |
|---|---|
| Fill | 0 or 8 |
| MessageTypeID | 8 |
| Bin ID | 1 |
| CPPNumber | 8 |
| TotalCPPCount | 8 |
| NumPadBytes | 7 |

Fill

Filler field for Control Channel MAC protocol header. This field shall be present for the first CPP in a Control protocol capsule and shall be set to zero. Otherwise, this field shall be omitted. In an embodiment, Control Channel MAC protocol overwrites this field with the Control Channel MAC Layer capsule Header Message Type ID The message type identifier. It shall be set based on the type of information this message carries. The valid values are listed in Table 2.

TABLE 2

| Value | Meaning |
|---|---|
| 0x00 | Flow Description message |
| 0x01 | RF Channel Description message |
| 0x02 | Neighbor List Description message |
| 0x03 | Filler message |
| 0xEF-0xFF | Reserved |

Bin ID

This corresponds to one of the two logical Control protocol Bins to which the message carried in the CPP payload is assigned by the network. The network shall set this field to the bin identifier (0 or 1) for the content carried in the CPP. If the MessageTypeID field is 0x03 (Filler message), this field may be assigned any value and is ignored by the device.

CPP Number

A unique number assigned to the CPP associated with the Control protocol information identified by the Message TypeID for this Bin. The network shall set its value ranging from 0 through TotalCPPCount−1.

Total CPP Count

The total number of CPPs that are associated with the Control protocol information identified by the Message TypeID for this Bin. Network shall set this field to the total number of CPPs carrying the messages of MessageTypeID.

Num Pad Bytes

The number of padding bytes included in this CPP. The network shall set this field to the number of PadBytes.

The Flow Description Message is shown in Table 3.

TABLE 3

| Field | Length (bits) |
|---|---|
| CPPHeader | 32 or 40 |
| FlowBlobLength | 8 |
| FlowCount | 7 |
| Reserved0 | 1 |

FlowCount occurrences of the remaining fields are shown in Table 4.

TABLE 4

| Field | Length (bits) |
|---|---|
| FlowID_bits_4_thru_19_SameAsBefore | 1 |
| FlowID_bits_4_thru_19 | 0 or 16 |
| FlowID_bits_0_thru_3 | 4 |
| RFChannelID | 8 |
| MLCIDSameAsBefore | 1 |
| MLC_ID | 0 or 8 |
| TransmitMode | 0 or 4 |
| OuterCodeRate | 0 or 4 |
| FlowBlob | FlowBlobLength |
| StreamID | 2 |
| StreamResidualErrorProcessing | 2 |
| StreamUsesBothComponents | 1 |
| Reserved1 | Variable (0-7) |

Flow Blob Length

Length of the FlowBlob (flow information block) field. The network shall set this field to the size of the FlowBlob field included in this message in integer number of bits.

Flow Count

The number of flows carried in the CPP. The network shall set this field to number of flows that follow this field in the Flow Description message CPP.

Reserved 0

This field shall be set to 0.

Flow ID Bits 4 thru 19 Same as Before

Flag to indicate if the FlowID_bits_4_thru_19 field for this flow is the same as the previous flow. The network shall set this field to '0' for the first flow in the Flow Description message CPP. Otherwise, if a flow described in a CPP has the same FlowID_bits_4_thru_19 as the previous flow, this field shall be set to '1'.

FlowID Bits 4 thru 19

This field contains the upper-16 bits (bits 4 through 19) of the identifier (FlowID) for the flow. If FlowID_bits_4_thru_19_SameAsBefore field is set to '1', the network shall omit this field. Otherwise, this field shall be set to the upper 16-bits of the flow ID.

FlowID Bits 0 thru 3

The network shall set this field to the lower 4-bits of the FlowID.

RF Channel ID
Identifier for the RF Channel carrying the flow. The details of RFChannelID are carried in RF Channel Description message.

MLC ID Same as Before
Flag to indicate if MLCID for this flow is same as the previous flow. The network shall set this field to '0' for the first flow in the Flow Description message CPP. Otherwise, if this flow has the same MLC ID as the previous flow, this field shall be set to '1'.

MLC ID
If MLCIDSameAsBefore field is set to '1', the network shall omit this field. Otherwise, this field shall contain a unique identifier of the MLC.

Transmit Mode
Transmit mode used by the MLC carrying this flow. If MLCIDSameAsBefore field is set to '1', the network shall omit this field, otherwise, the network shall set this field to the Physical layer mode used to transmit the MLC.

Outer Code Rate
Outer code rate for the MLC carrying this flow. If MLC-IDSameAsBefore field is set to '1', the network shall omit this field, otherwise, the network shall set this field to the outer code rate applied to the MLC. Values for the Outer-CodeRate field are listed in Table 5.

TABLE 5

| Value | Meaning |
| --- | --- |
| '0000' | None |
| '0001' | Reed-Solomon encoding rate ⅞ |
| '0010' | Reed-Solomon encoding rate ¾ |
| '0011' | Reed-Solomon encoding rate ½ |
| | All other values are reserved. |

Flow Blob
This field carries the flow information used by the upper layers. The network shall set this field as per the requirements of upper layers.

Stream ID
This 2-bit field is the stream identifier. The network shall set the Strea,mID field to the values specified in Table 6.

TABLE 6

| Value | Meaning |
| --- | --- |
| '00' | Stream 0 |
| '01' | Stream 1 |
| '10' | Stream 2 |
| | All other values are reserved. |

Stream Residual Error Processing
This field specifies the Stream layer residual error processing at the device. The network shall set this field as per the values listed in Table 7.

TABLE 7

| Value | Meaning |
| --- | --- |
| '00' | None |
| '01' | Drop |
| | All other values are reserved. |

Stream Uses Both Components
This field specifies if stream contains both the enhancement and base components or just the base component. The network shall set this field to '0' if stream contains only the base component. The network shall set this field to '1' if stream contains both the base and enhancement components. If the MLC that this stream belongs to is using a non-layered transmit mode, then the network may set this field to any value and this field is ignored by the device.

Reserved
This variable length field is added to make the Flow Description message octet aligned. This field shall be set to 0.
The RF Channel Description message carries the description of the RF Carriers used for carrying FLO Services. The message shall have format shown in Table 8.

TABLE 8

| Field | Length (bits) |
| --- | --- |
| CPPHeader | 32 or 40 |
| LOICount | 8 |

Table 9 shows the LOICount occurrences of the following LOI record.

TABLE 9

| LOI_ID | 16 |
| --- | --- |
| RFChannelCount | 4 |

Table 10 shows the RFChannelCount occurrences of the following three fields.

TABLE 10

| RFChannelID | 8 |
| --- | --- |
| Frequency | 13 |
| ChannelPlan | 3 |

CPP Header
The CPP header.

LOI Count
The number Local Operational Infrastructure records included in this message. The network shall set this field to the number of LOI Records included in the message.

LOI ID
This field contains the ID of the Local-area infrastructure identifier associated with this LOI Record. The network shall set this field to the identifier assigned to the Local-area infrastructure.

RF Channel Count
The network shall set this field to number of RF Channels that follow this field in the RF Channel Description message CPP.

RF Channel ID
The network shall set this field to the numerical identifier associated with the combination of Frequency and Channel-Plan field values included in this record.

Frequency
The network shall set this field to the frequency offset from 470 MHz (start of the FCC Broadcast TV allocation for channels 14-69) to the carrier center frequency in units of 50 KHz. This is calculated by the equation below:

$$\text{Frequency} = \frac{(C-470)}{0.05},$$

where C is the carrier center frequency in MHz.

Channel Plan

The network shall set this field to the channel plan (or Channel Bandwidth) used by the transmitter. The values for this field are listed in Table 11.

TABLE 11

| Value | Meaning |
|---|---|
| '000' | 5 MHz channel |
| '001' | 6 MHz channel |
| '010' | 7 MHz channel |
| '011' | 8 MHz channel |
|  | All other values are reserved |

Reserved

This field is added to make the RF Channel Description message octet aligned. Network shall set the bits in this field to '0'.

The Neighbor List Description message carries the infrastructure parameters of the neighboring LOIs for a given LOI. The infrastructure parameters included are frequency, Wide-area Differentiators (WID) and corresponding Local-Area Differentiators (LID). The message shall have the format shown in Table 12.

TABLE 12

| Field | Length (bits) |
|---|---|
| CPPHeader | 32 or 40 |
| LOICount | 8 |

Table 13 shows the LOICount occurrences of the following LOI record.

TABLE 13

| LOI_ID | 16 |
|---|---|
| FrequencyCount | 4 |

Table 14 shows the FrequencyCount occurrences of the following Frequency Record

TABLE 14

| Frequency | 13 |
|---|---|
| ChannelPlan | 3 |
| WIDCount | 4 |

Table 15 shows the WIDCount occurrences of the following WID Record.

TABLE 15

| WID | 4 |
|---|---|
| LIDCount | 4 |

Table 16 shows the LIDCount occurrences of the following field

TABLE 16

| LID | 4 |
|---|---|

The CPP Header
The CPP header.

LOI Count
The number of Local Operational Infrastructure records included in this message. The network shall set this field to the number of LOI Records included in the message.

LOI ID
This field contains the ID of the Local-area infrastructure identifier associated with this LOI Record. The network shall set this field to the identifier assigned to the Local-area infrastructure.

Frequency Count
The number of frequencies included in the LOI record. The network shall set this field to the number of Frequency records included in the LOI record.

Frequency
This field contains the frequency offset from 470 MHz (start of the FCC Broadcast TV allocations for channels 14-69) to the center frequency in units of 50 kHz.

Channel Plan
This field contains the channel plan used for Local-area transmissions.

WID Count
The network shall set this field to number of WID records following this field.

WID
The network shall set this field to the Wide-Area Differentiator associated with this Wide-area.

LID Count
The network shall set this field to number of LID records following this field.

LID
The network shall set this field to the Local-Area Differentiator associated with this Local-area.

Reserved
This is a variable length field added to make the Neighbor List Description message octet aligned. Network shall set the bits in this field to '0'.

Table 17 shows the Filler message. The Filler message is used to fill the unused portion of the Control protocol capsule payload after all the Control protocol messages carrying Control information have been included. The Filler message does not belong to any bin. Therefore the BinID field in the CPP header of this message is included but not used. In an embodiment, the network sets all the FillerOctets bits in this field to '0'.

TABLE 17

| Field | Length (bits) |
|---|---|
| CPPHeader | 32 or 40 |
| FillerOctets | 944 |

The control protocol in the network shall add sufficient padding octets to fill any unoccupied portion of the CPP. The format of PadByte is shown in Table 18.

TABLE 18

| Field | Value |
| --- | --- |
| PadByte | 0x00 |

The Stream layer resides between the MAC layer and the Upper/Application layer in the FLO protocol stack as shown in FIG. 6. Data from the Upper layer is carried in one or more flows. The Stream layer provides access to the FLO Air Interface protocol stack for the flows to and from the Upper layer. A flow can consist of one component (referred to as the base component) or two components (referred to as base and enhancement components). When a flow has two components, the enhancement component is tightly coupled with the base component. For example, both components are addressed using the same flow ID, are delivered to the same Upper layer entity in the device and receive the same delay and error treatment in the Stream layer.

In accordance with an embodiment, a primary function of the Stream layer is to multiplex/demultiplex up to three flows to/from a single MLC.

The Stream protocol provides the functionality of the Stream layer. It multiplexes Upper layer flows into a single MLC. These Upper layer flows are transported as "streams" in an MLC. Up to three streams (referred to as stream 0, 1 and 2) are multiplexed into one MLC. Stream 0 is always present in an MLC if there is flow data to be sent for stream 1 and/or stream 2. In other words, if there is no flow data to be sent for any of the streams, stream 0 is not sent.

An Upper layer flow can consist of a base component and an enhancement component. If both components are present, both components are carried by the same stream. Stream 0 only carries a base component even when the associated MLC is configured for a layered transmit mode. The other two streams (streams 1 and 2) can carry both base and enhancement components. When a stream carries an enhancement component, the Upper layer for that flow is required to exactly match the sizes of the base and enhancement components.

The Stream protocol supports two interface modes:
  Octet flow mode in which the Stream protocol in the network receives a stream of octets from the Upper layer and the peer protocol in the device delivers a stream of octets.
  Transparent or Block flow mode in which the Stream protocol in the network receives a stream of fixed sized octet blocks and the peer protocol in the device delivers these fixed sized octet blocks to the Upper layer.

The Stream protocol provides the TransparentModeFlag attribute to select the interface mode for each Upper layer flow. When this attribute is set to '1', the Stream protocol receives a stream of fixed, 122 octet blocks, each of which is carried by a separate Physical layer packet. This allows the Upper layer visibility to packet boundaries at the lower FLO protocol layers. This Transparent or Block flow mode (also referred to as the block-oriented mode) is only supported for streams 1 and 2.

If the TransparentModeFlag attribute is set to '0' for a flow, the Stream protocol processes the data from the Upper layer flow as a stream of octets. This interface is appropriate if the Upper layer is not concerned with the formation of lower layer packets. Stream 0 always uses this Octet flow mode (also referred to as the octet-oriented mode). Stream 1 and 2 use either of the two modes, the Block flow mode or the Octet flow mode.

The Stream protocol provides an interface to specify Stream layer residual error processing for an Upper layer flow using the ResidualErrorProcessing attribute. This selection applies to both the base component and the enhancement component (when present) of a flow. Choices include:
  None—specifies that the flow carried by the stream is to be delivered to the Upper layer entity with no additional processing. Octets of the flow received in packets containing errors are delivered to the Upper layer entity.
  Drop—specifies that the octets of the flow received in packets containing errors are to be discarded.

The Stream protocol provides an interface to specify delay constraints for an Upper layer flow. The delay constraint is specified in terms of three attributes, namely DelayConstraintType, DelayConstraintValue and StreamElasticity:
  DelayConstraintType specifies the delay constraint type for a flow. This selection applies to both the base component and enhancement component (when present) of a flow. Choices include:
    RealTime—specifies that the flow be delayed by a constant value.
    MaxDelay—specifies that the flow have a maximum delay constraint.
    None—specifies that the flow be sent only when extra MLC bandwidth is available.
  DelayConstraintValue specifies the value of the delay constraint for an Upper layer flow when DelayConstraintType is RealTime or MaxDelay.
  StreamElasticity specifies how to handle the flow when the delay constraints cannot be met. This selection applies to both the base and enhancement (when present) components of a flow. Choices include:
    Elastic—specifies that the source reduces the data rate upon request.
    Drop—specifies that flow octets can be dropped.
    Fragment—specifies that all or part of the octets can be delayed.

This document assumes that there is one instance of this protocol in the network for each active Data Channel MLC. In the device there is one instance of this protocol for each MLC that the device is decoding.

This protocol operates in one of two states:
  Inactive State: In this state the protocol waits for an Activate command.
  Active State: In this state the protocol in the network packetizes up to three flows, multiplexes these packets for transmission in the associated MLC and sends them to the MAC layer. The protocol in the device receives Stream layer packets from the MAC layer, handles residual transmission errors and delivers the resulting octet or octet block flows to the Upper layer.

The Stream layer provides the following functions:
Provides an interface to bind Upper layer flows to streams in an MLC. Each MLC can support three independent data streams.
Multiplexes up to three flows from the Upper layer into one MLC.
Accommodates delay constraints of an Upper layer flow.
Provides for residual error handling for an Upper layer flow.
Provides for independent handling of base and enhancement components of an Upper layer flow.

The MAC layer defines the operation of Wide-area and Local-area OIS Channels, Wide-area and Local-area Control Channels and Data Channels. The MAC layer also multiplexes MLCs for transmission at the FLO network and demultiplexes them at the FLO device. The MAC layer includes the following three protocols:

OIS Channel MAC Protocol: This protocol contains the rules governing how the FLO network builds the messages transmitted in the OIS Channels and how the FLO device receives and processes these messages.

Data Channel MAC Protocol: This protocol contains the rules governing how the FLO network builds the MAC layer packets for transmission of service carrying data on the Wide-area and Local-area Data Channels and how the FLO device receives and processes these packets.

Control Channel MAC Protocol: This protocol contains the rules governing how the FLO network builds the MAC layer packets for transmission of FLO Control information on the Wide-area and Local-area Control Channels and how the FLO device receives and processes these packets.

The Data Channel and Control Channel are defined at the MAC layer. At the Physical layer both of these channel types are carried on the same Data Channel.

The content of an MLC for one superframe is encapsulated in an entity referred to as MAC protocol capsule. MAC protocol capsule is carried in MAC layer packets. One MAC layer packet is 122 octets in size and forms the payload of one Physical layer packet (PLP).

The transmission unit of the Physical layer is a Physical layer packet. A Physical layer packet has a length of 1000 bits. A Physical layer packet carries one MAC layer packet.

The FLO Physical layer is comprised of the following sub-channels:
The TDM Pilot Channel.
The Wide-area OIS Channel.
The Local-area OIS Channel.
The Wide-area FDM Pilot Channel.
The Local-area FDM Pilot Channel.
The Wide-area Data Channel.
The Local-area Data Channel.

The TDM Pilot Channel comprises the component channels TDM Pilot 1, TDM Pilot 2, Transition Pilot Channel, WIC, LIC, and Positioning Pilot/Reserved Symbols.

The TDM Pilot 1 Channel shall span one OFDM symbol. It shall be transmitted at the OFDM symbol index 0 in the superframe. It signals the start of a new superfame. It may be used by the FLO device for determining the coarse OFDM symbol timing, the superframe boundary and the carrier frequency offset.

The Wide-area Identification Channel (WIC) shall span one OFDM symbol. It shall be transmitted at OFDM symbol index 1 in a superframe. It follows the TDM Pilot 1 OFDM symbol. This is an overhead channel that is used for conveying the Wide-area Differentiator information to FLO receivers. All transmit waveforms within a Wide-area (Including Local-area channels but excluding the TDM Pilot 1 Channel and the PPC) are scrambled using the 4-bit Wide-area Differentiator corresponding to that area. For the WIC OFDM symbol in a superframe only 1 slot shall be allocated. The allocated slot shall use as input a 1000-bit fixed pattern, with each bit set to zero.

The Local-area Identification Channel (LIC) shall span one OFDM symbol. It is transmitted at OFDM symbol index 2 in a superframe. It follows the WIC channel OFDM symbol. This is an overhead channel that is used for conveying the Local-area Differentiator information to FLO receivers. All Local-area transmit waveforms are scrambled using a 4-bit Local-area Differentiator, in conjunction with the Wide-area Differentiator, corresponding to that area.

For the LIC OFDM symbol in a superframe only a single slot shall be allocated. The allocated slot shall use a 1000-bit fixed pattern as input. These bits shall be set to zero.

The TDM Pilot 2 Channel shall span one OFDM symbol. It shall be transmitted at OFDM symbol index 3 in a superframe. It follows the LIC OFDM symbol. It may be used for fine OFDM symbol timing corrections in the FLO receivers.

For the TDM Pilot 2 OFDM symbol in each superframe only 4 slots shall be allocated. Each allocated slot shall use as input a 1000-bit fixed pattern, with each bit set to zero.

The Transition Pilot Channel consists of 2 sub-channels: the Wide-area Transition Pilot Channel (WTPC) and the Local-area Transition Pilot Channel (LTPC). The TPC flanking the Wide-area OIS and the Wide-area Data Channel is called the WTPC. The TPC flanking the Local-area OIS and the Local-area Data Channel is called the LTPC. The WTPC spans 1 OFDM symbol on either side of every Wide-area channel transmission with the exception of WIC (the Wide-area Data and the Wide-area OIS Channel) in a superframe. The LTPC spans 1 OFDM symbol on either side of every Local-area Channel transmission with the exception of LIC (the Local-area Data and the Local-area OIS Channel). The purpose of the TPC OFDM symbol is two-fold: to allow channel estimation at the boundary between the Local-area and the Wide-area channels and to facilitate timing synchronization for the first Wide-area (or Local-area) MLC in each frame. The TPC spans 20 OFDM symbols in a superframe, which are equally divided between the WTPC and the LTPC.

In an embodiment, there are nine instances where the LTPC and the WTPC transmissions occur right next to each other and two instances where only one of these channels is transmitted. Only the WTPC is transmitted after the TDM Pilot 2 Channel, and only the LTPC is transmitted prior to the Positioning Pilot Channel (PPC)/Reserved OFDM symbols.

Let:
P be the number of OFDM symbols in the PPC/Reserved OFDM symbols.
W be the number of OFDM symbols associated with the Wide-area Data Channel in a frame.
L be the number of OFDM symbols associated with the Local-area Data Channel in a frame.
F be the number of OFDM symbols in a frame.

The values of P shall be 2, 6, 10 or 14. The number of Data Channel OFDM symbols in a frame shall be F-4. The exact locations of the TPC OFDM symbols in a superframe shall be as specified in Table 19.

TABLE 19

TPC Location Indices in a Superframe

| Transition Pilot Channel | Index for the WTPC OFDM Symbol | Index for the LTPC OFDM Symbol |
|---|---|---|
| TDM Pilot 2 Channel → Wide-area OIS Channel | 4 | — |
| Wide-area OIS Channel → Local-area OIS Channel | 10 | 11 |
| Local-area OIS Channel → Wide-area Data Channel | 18 | 17 |
| Wide-area Data Channel → Local-area Data Channel | $19 + W + F \times i$, $\{i = 0, 1, 2, 3\}$ | $20 + W + F \times i$, $\{i = 0, 1, 2, 3\}$ |
| Local-area Data Channel → Wide-area Data Channel | $18 + F \times i$, $\{i = 1, 2, 3\}$ | $18 + F \times i$, $\{i = 1, 2, 3\}$ |

TABLE 19-continued

TPC Location Indices in a Superframe

| Transition Pilot Channel | Index for the WTPC OFDM Symbol | Index for the LTPC OFDM Symbol |
|---|---|---|
| Local-area Data Channel → PPC/Reserved Symbols | — | 1199-P |

All slots in the TPC OFDM symbols use as input a 1000-bit fixed pattern, with each bit set to zero.

In an embodiment, the FLO device may use a Positioning Pilot Channel (PPC) either autonomously or in conjunction with the GPS signal to determine its geographical location.

The Wide-areaOIS channel is used to convey overhead information about the active MLC's associated with the Wide-area Data Channel, such as their scheduled transmission times and slot allocations, in the current superframe. In an embodiment, the Wide-area OIS Channel spans five OFDM symbol intervals in each superframe.

The Local-area OIS Channel is used to convey overhead information about the active MLCs associated with the Local-area Data Channel, such as their scheduled transmission times and slot allocations, in the current superframe. In an embodiment, the Local-area OIS Channel spans five OFDM symbol intervals in each superframe.

The Wide-area FDM Pilot Channel is transmitted in conjunction with the Wide-area Data Channel or the Wide-area OIS Channel. The Wide-area FDM Pilot Channel carries a fixed bit pattern that may be used for Wide-area Channel estimation and other functions by the FLO device.

For the Wide-area FDM Pilot Channel a single slot shall be allocated during every OFDM symbol that carries either the Wide-area Data Channel or the Wide-area OIS Channel. The allocated slot shall use a 1000-bit fixed pattern as input. These bits shall be set to zero.

The Local-area FDM Pilot Channel is transmitted in conjunction with the Local-area Data Channel or the Local-area OIS Channel. The Local-area FDM Pilot Channel carries a fixed bit pattern that may be used for Local-area channel estimation and other functions by the FLO device.

For the Local-area FDM Pilot Channel a single slot shall be allocated during every OFDM symbol that carries either the Local-area Data Channel or the Local-area OIS Channel. The allocated slot shall use a 1000-bit fixed pattern as input. These bits shall be set to zero.

The Wide-area Data Channel is used to carry Physical layer packets meant for Wide-area multicast. The Physical layer packets for the Wide-area Data Channel can be associated with any one of the active MLCs transmitted in the Wide-area.

For regular modulation (QPSK and 16-QAM), the Physical layer packet is turbo-encoded and bit interleaved before being stored in the Data slot buffer(s). For layered modulation, the base component Physical layer packet and the enhancement component Physical layer packet are turbo-encoded and bit interleaved independently before being multiplexed into the Data slot buffer(s).

The Local-area Data Channel is used to carry Physical layer packets meant for Local-area multicast. The Physical layer packets for the Local-area Data Channel can be associated with any one of the active MLCs transmitted in the Local-area.

For regular modulation (QPSK and 16-QAM), the physical layer packet is turbo-encoded and bit interleaved before being stored in the Data slot buffer(s). For layered modulation, the base component Physical layer packet and the enhancement component Physical layer packet are turbo-encoded and bit interleaved independently before being multiplexed into the Data slot buffer(s).

Figure 8:
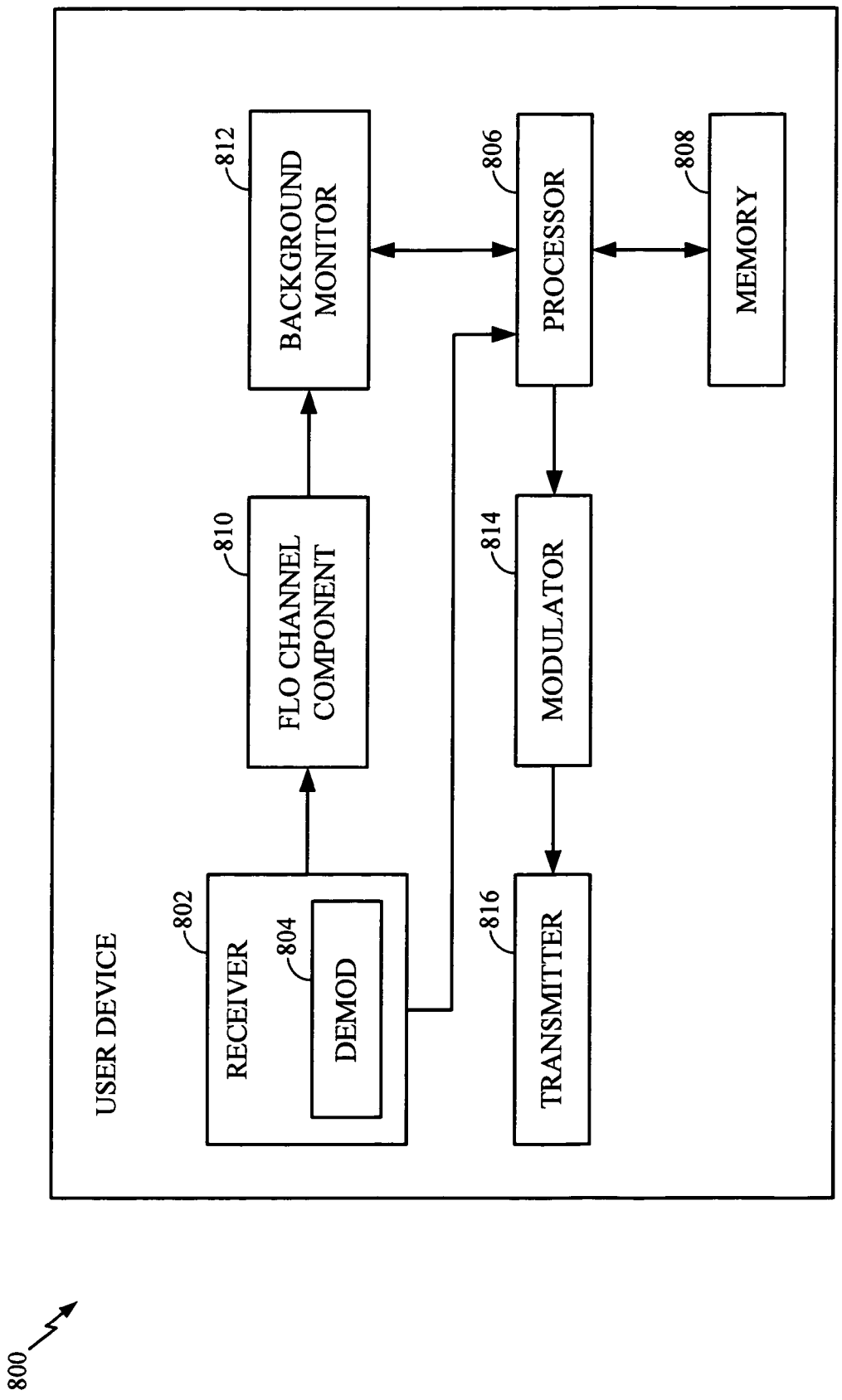
FIG. 8 is a diagram illustrating an example user device for a wireless system.

FIG. 8 is an illustration of a user device 800 that is employed in a wireless communication environment, in accordance with one or more aspects set forth herein. User device 800 comprises a receiver 802 that receives a signal from, for instance, a receive antenna (not shown), and performs typical actions thereon (e.g., filters, amplifies, down converts, etc.) the received signal and digitizes the conditioned signal to obtain samples. Receiver 802 can be a non-linear receiver. A demodulator 804 can demodulate and provide received pilot symbols to a processor 806 for channel estimation. A FLO channel component 810 is provided to process FLO signals as previously described. This can include digital stream processing and/or positioning location calculations among other processes. Processor 806 can be a processor dedicated to analyzing information received by receiver 802 and/or generating information for transmission by a transmitter 816, a processor that controls one or more components of user device 800, and/or a processor that both analyzes information received by receiver 802, generates information for transmission by transmitter 816, and controls one or more components of user device 800.

User device 800 can additionally comprise memory 808 that is operatively coupled to processor 806 and that stores information related to wireless network data processing. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory. User device 800 further comprises a background monitor 814 for processing FLO data, a symbol modulator 814 and a transmitter 816 that transmits the modulated signal.

Figure 9:
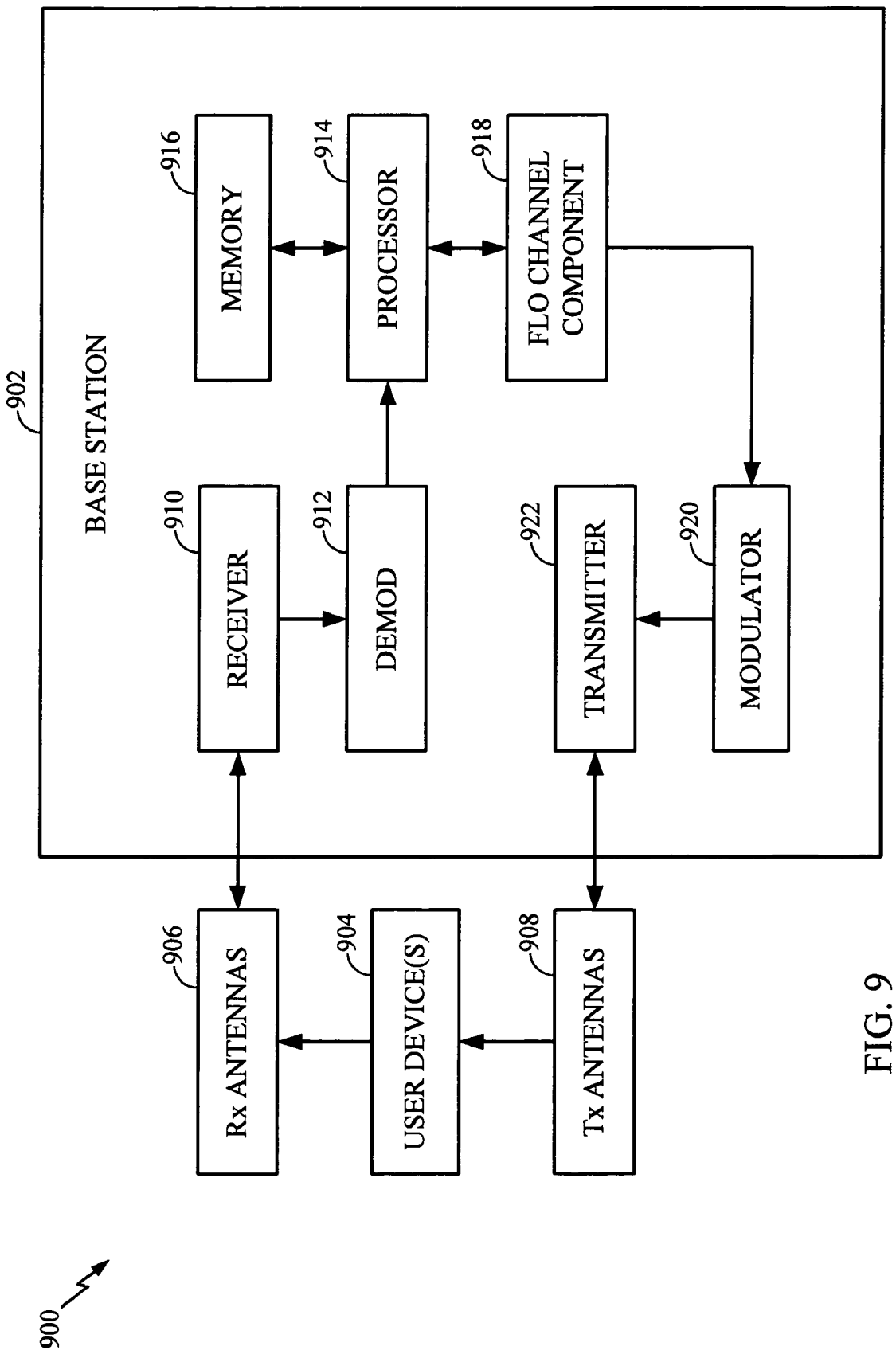
FIG. 9 is a diagram illustrating an example base station for a wireless system.

FIG. 9 is an illustrates an example system 900 that comprises a base station 902 with a receiver 910 that receives signal(s) from one or more user devices 904 through a plurality of receive antennas 906, and a transmitter 924 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 that is similar to the processor described above, and which is coupled to a memory 916 that stores information related to wireless data processing. Processor 914 is further coupled to a FLO channel 918 component that facilitates processing FLO information associated with one or more respective user devices 904.

A modulator 922 can multiplex a signal for transmission by a transmitter 924 through transmit antenna 908 to user devices 904. FLO channel component 918 can append information to a signal related to an updated data stream for a given transmission stream for communication with a user device 904, which can be transmitted to user device 504 to provide an indication that a new optimum channel has been identified and acknowledged.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to process forward link only (FLO) wireless signals on a communications device, comprising:
   receiving a FLO signal;
   processing a Time-Division Multiplexing (TDM) pilot comprising a TDM Pilot 1, a TDM Pilot 2, a Wide-area Identification Channel (WIC), a Local-area Identification Channel (LIC), a Transition Pilot Channel, and a Positioning Pilot, from the FLO signal;
   processing an overhead information symbol (OIS) comprising a wide-area OIS and a local-area OIS, from the FLO signal, wherein the wide-area OIS conveys information required to locate relevant data symbols in a wide-area data channel;
   processing a Frequency-Division Multiplexing (FDM) pilot comprising a wide-area FDM pilot and a local-area FDM pilot, from the FLO signal; and
   processing data comprising wide-area data and local-area data, from the FLO signal.

2. The method of claim 1, wherein the TDM pilot, the OIS, the FDM pilot, and the data are organized into a superframe in the FLO signal.

3. The method of claim 2, wherein the superframe comprises approximately 1200 Orthogonal Frequency Division Multiplexing (OFDM) symbols.

4. The method of claim 3, wherein each symbol comprises seven interlaces of active sub-carriers.

5. The method of claim 2, wherein approximately 6 MHz of bandwidth is allocated to the FLO signal.

6. The method of claim 5, wherein the superframe comprises approximately 200 OFDM symbols per allocated MHz.

7. The method of claim 2, wherein the Transition Pilot Channel comprises a Wide-area Transition Pilot Channel (WTPC) and a Local-area Transition Pilot Channel (LTPC).

8. The method of claim 7, wherein the superframe comprises a plurality of OFDM symbols identifiable by consecutively numbered indeces, wherein an OFDM symbol for the WTPC occurs at least at indices having a value V represented by the expression $V=19+W+F\times i,$ wherein W comprises a total number of OFDM symbols in the superframe associated with the wide-area data, wherein F comprises a total number of OFDM symbols in the superframe, and wherein i is selected from the numbers zero (0), one (1), two (2) and three (3).

9. The method of claim 7, wherein the superframe comprises a plurality of OFDM symbols identifiable by consecutively numbered indeces, wherein an OFDM symbol for the WTPC occurs at least at indices having a value V represented by the expression $V=18+F\times i,$ wherein F comprises a total number of OFDM symbols in the superframe, and wherein i is selected from the numbers one (1), two (2) and three (3).

10. The method of claim 7, wherein the superframe comprises a plurality of OFDM symbols identifiable by consecutively numbered indeces, wherein an OFDM symbol for the LTPC occurs at least at indices having a value V represented by the expression $V=20+W+F\times i,$ wherein W comprises a total number of OFDM symbols in the superframe associated with the wide-area data, wherein F comprises a total number of OFDM symbols in the superframe, and wherein i is selected from the numbers zero (0), one (1), two (2) and three (3).

11. The method of claim 7, wherein the superframe comprises a plurality of OFDM symbols identifiable by consecutively numbered indeces, wherein an OFDM symbol for the WTPC occurs at least at indices having a value V represented by the expression $V=18+F\times i,$ wherein F comprises a total number of OFDM symbols in the superframe, and wherein i is selected from the numbers one (1), two (2) and three (3).

12. The method of claim 1, wherein the TDM Pilot 1, TDM Pilot 2, WIC, and LIC occur consecutively in the FLO signal.

13. The method of claim 1, wherein the FDM Pilot is frequency division multiplexed with the OIS in the FLO signal.

14. The method of claim 1, wherein the Transition Pilot Channel is time division multiplexed with the OIS and the data in the FLO signal.

15. The method of claim 1, wherein the Transition Pilot Channel comprises a Wide-area Transition Pilot Channel (WTPC) and a Local-area Transition Pilot Channel (LTPC).

16. The method of claim 1, wherein receiving the FLO signal comprises wireless receiving the FLO signal.

17. An apparatus, comprising:
   a receiver configured to receive a forward link only (FLO) signal;
   a FLO channel component configured to process a Time-Division Multiplexing (TDM) pilot, an overhead information symbol (OIS), and a Frequency-Division Multiplexing (FDM) pilot from the FLO signal; and
   a processor configured to analyze data comprising wide-area data and local-area data processed from the FLO signal,
   wherein the TDM pilot comprises a TDM Pilot 1, a TDM Pilot 2, a Wide-area Identification Channel (WIC), a Local-area Identification Channel (LIC), a Transition Pilot Channel, and a Positioning Pilot,
   wherein the OIS comprises a wide-area OIS and a local-area OIS, the wide-area OIS conveying information required to locate relevant data symbols in a wide-area data channel, and
   wherein the FDM pilot comprises a wide-area FDM pilot and a local-area FDM pilot.

18. The apparatus of claim 17, wherein the TDM pilot, the OIS, the FDM pilot, and the data are organized into a superframe in the FLO signal.

19. The apparatus of claim 18, wherein the superframe comprises approximately 1200 Orthogonal Frequency Division Multiplexing (OFDM) symbols.

20. The apparatus of claim 19, wherein each symbol comprises seven interlaces of active sub-carriers.

21. The apparatus of claim 18, wherein approximately 6 MHz of bandwidth is allocated to the FLO signal.

22. The apparatus of claim 21, wherein the superframe comprises approximately 200 OFDM symbols per allocated MHz.

23. The apparatus of claim 18, wherein the Transition Pilot Channel comprises a Wide-area Transition Pilot Channel (WTPC) and a Local-area Transition Pilot Channel (LTPC).

24. The apparatus of claim 23, wherein the superframe comprises a plurality of OFDM symbols identifiable by consecutively numbered indeces, wherein an OFDM symbol for the WTPC occurs at least at indices having a value V represented by the expression $$V=19+W+F \times i,$$

wherein W comprises a total number of OFDM symbols in the superframe associated with the wide-area data, wherein F comprises a total number of OFDM symbols in the superframe, and wherein i is selected from the numbers zero (0), one (1), two (2) and three (3).

25. The apparatus of claim 23, wherein the superframe comprises a plurality of OFDM symbols identifiable by consecutively numbered indeces, wherein an OFDM symbol for the WTPC occurs at least at indices having a value V represented by the expression $$V=18+F \times i,$$

wherein F comprises a total number of OFDM symbols in the superframe, and wherein i is selected from the numbers one (1), two (2) and three (3).

26. The apparatus of claim 23, wherein the superframe comprises a plurality of OFDM symbols identifiable by consecutively numbered indeces, wherein an OFDM symbol for the LTPC occurs at least at indices having a value V represented by the expression $$V=20+W+F \times i,$$

wherein W comprises a total number of OFDM symbols in the superframe associated with the wide-area data, wherein F comprises a total number of OFDM symbols in the superframe, and wherein i is selected from the numbers zero (0), one (1), two (2) and three (3).

27. The apparatus of claim 23, wherein the superframe comprises a plurality of OFDM symbols identifiable by consecutively numbered indeces, wherein an OFDM symbol for the WTPC occurs at least at indices having a value V represented by the expression $$V=18+F \times i,$$

wherein F comprises a total number of OFDM symbols in the superframe, and wherein i is selected from the numbers one (1), two (2) and three (3).

28. The apparatus of claim 17, wherein the TDM Pilot 1, TDM Pilot 2, WIC, and LIC occur consecutively in the FLO signal.

29. The apparatus of claim 17, wherein the FDM Pilot is frequency division multiplexed with the OIS in the FLO signal.

30. The apparatus of claim 17, wherein the Transition Pilot Channel is time division multiplexed with the OIS and the data in the FLO signal.

31. The apparatus of claim 17, wherein the Transition Pilot Channel comprises a Wide-area Transition Pilot Channel (WTPC) and a Local-area Transition Pilot Channel (LTPC).

32. The apparatus of claim 17, wherein the receiver is configured to wirelessly receive the FLO signal.

33. An apparatus for processing forward link only (FLO) wireless signals, comprising:
    means for receiving a FLO signal;
    means for processing a Time-Division Multiplexing (TDM) pilot comprising a TDM Pilot 1, a TDM Pilot 2, a Wide-area Identification Channel (WIC), a Local-area Identification Channel (LIC), a Transition Pilot Channel, and a Positioning Pilot, from the FLO signal;
    means for processing an overhead information symbol (OIS) comprising a wide-area OIS and a local-area OIS, from the FLO signal, wherein the wide-area OIS conveys information required to locate relevant data symbols in a wide-area data channel;
    means for processing a Frequency-Division Multiplexing (FDM) pilot comprising a wide-area FDM pilot and a local-area FDM pilot, from the FLO signal; and
    means for processing data comprising wide-area data and local-area data, from the FLO signal.

34. A computer readable storage medium encoded thereon with instructions that when executed cause an apparatus to perform a method of processing forward link only (FLO) wireless signals, said method comprising:
    receiving a FLO signal;
    processing a Time-Division Multiplexing (TDM) pilot comprising a TDM Pilot 1, a TDM Pilot 2, a Wide-area Identification Channel (WIC), a Local-area Identification Channel (LIC), a Transition Pilot Channel, and a Positioning Pilot, from the FLO signal;
    processing an overhead information symbol (OIS) comprising a wide-area OIS and a local-area OIS, from the FLO signal, wherein the wide-area OIS conveys information required to locate relevant data symbols in a wide-area data channel;
    processing a Frequency-Division Multiplexing (FDM) pilot comprising a wide-area FDM pilot and a local-area FDM pilot, from the FLO signal; and
    processing data comprising wide-area data and local-area data, from the FLO signal.

35. A method to transmit forward link only (FLO) wireless signals from a transmission device, comprising:
    processing data comprising wide-area data and local-area data;
    appending a Frequency-Division Multiplexing (FDM) pilot comprising a wide-area FDM pilot and a local-area FDM pilot, to the data;
    appending an overhead information symbol (OIS) comprising a wide-area OIS and a local-area OIS, to the data, wherein the wide-area OIS conveys information required to locate relevant data symbols in a wide-area data channel;
    appending a Time-Division Multiplexing (TDM) pilot comprising a TDM Pilot 1, a TDM Pilot 2, a Wide-area Identification Channel (WIC), a Local-area Identification Channel (LIC), a Transition Pilot Channel, and a Positioning Pilot, to the data;
    modulating the data and appended pilots and symbols for transmission as a FLO signal; and
    transmitting the FLO signal.

36. The method of claim 35, wherein transmitting the wide-area data, FDM pilot, OIS, and Identification Channel comprises radiating identical waveforms from a group of transmitters with a footprint covering one or more metropolitan areas.

37. The method of claim 36, wherein transmitting the local-area data, FDM pilot, OIS, and Identification Channel comprises radiating identical waveforms from a group of transmitters with a footprint that is smaller in area than the footprint of the group of transmitters transmitting the wide-area data, FDM pilot, OIS, and Identification Channel.

38. An apparatus, comprising:
- a processor configured to process data comprising wide-area data and local-area data;
- a forward link only (FLO) channel component configured to append a Frequency-Division Multiplexing (FDM) pilot comprising a wide-area FDM pilot and a local-area FDM pilot; an overhead information symbol (OIS) comprising a wide-area OIS and a local-area OIS; and a Time-Division Multiplexing (TDM) pilot comprising a TDM Pilot 1, a TDM Pilot 2, a Wide-area Identification Channel (WIC), a Local-area Identification Channel (LIC), a Transition Pilot Channel, and a Positioning Pilot, to the data;
- a modulator configured to modulate the data and appended pilots and symbols for transmission as a FLO signal; and
- a transmitter configured to transmit the FLO signal,
- wherein the wide-area OIS conveys information required to locate relevant data symbols in a wide-area data channel.

39. The apparatus of claim 38, comprising a first group of transmitters configured to transmit the wide-area data, FDM pilot, OIS, and Identification Channel by radiating identical waveforms and with a footprint covering one or more metropolitan areas.

40. The apparatus of claim 39, comprising a second group of transmitters configured to transmit the local-area data, FDM pilot, OIS, and Identification Channel by radiating identical waveforms and with a footprint that is smaller in area than the footprint of the first group of transmitters.

* * * * *